United States Patent [19]

Kohlbauer et al.

[11] 4,368,010

[45] Jan. 11, 1983

[54] APPARATUS FOR ADMITTING LIQUID TO THE VESSELS OF DEVELOPING MACHINES FOR PHOTOSENSITIVE MATERIAL

[75] Inventors: Walter Kohlbauer, Kaufbeuren; Günter Schirk, Munich, both of Fed. Rep. of Germany

[73] Assignee: Agfa-Gevaert Aktiengesellschaft, Leverkusen, Fed. Rep. of Germany

[21] Appl. No.: 172,393

[22] Filed: Jul. 25, 1980

[30] Foreign Application Priority Data

Jul. 31, 1979 [DE] Fed. Rep. of Germany ....... 2931050
Jul. 31, 1979 [DE] Fed. Rep. of Germany ... 7921875[U]

[51] Int. Cl.[3] ........................ F04B 27/02; F16J 11/02; F01B 1/06

[52] U.S. Cl. .................................... 417/271; 417/238; 92/171; 92/13.2; 92/13.7

[58] Field of Search ............... 417/273, 470, 238, 271, 417/454; 92/13.8, 13.2, 13.7, 13.4, 171; 418/70

[56] References Cited

U.S. PATENT DOCUMENTS

| | | | |
|---|---|---|---|
| 1,750,170 | 3/1930 | Frisch | 417/238 |
| 2,540,328 | 2/1951 | Gray | 417/214 |
| 3,092,037 | 6/1963 | Rhodes | 417/273 |
| 3,144,177 | 8/1964 | Cookson | 92/13.8 X |
| 3,578,218 | 5/1971 | Atwood | 417/454 X |
| 3,871,268 | 3/1975 | Misima | 417/429 X |
| 4,105,371 | 8/1978 | Savage et al. | 417/273 X |
| 4,211,519 | 7/1980 | Hogan | 417/360 |

FOREIGN PATENT DOCUMENTS

| | | | |
|---|---|---|---|
| 1907159 | 11/1969 | Fed. Rep. of Germany . | |
| 2030642 | 4/1980 | United Kingdom | 417/214 |

*Primary Examiner*—William L. Freeh
*Attorney, Agent, or Firm*—Kontler, Grimes & Battersby

[57] ABSTRACT

A developing machine has a battery of vessels which receive metered quantities of liquid from discrete membrane-type pumping units. The pumping units constitute part of an apparatus having a single drive for the reciprocable membrane-deforming pumping elements of all units. The components of the drive for the pumping units as well as the pumping units themselves, are discrete modules which are rapidly connectable to or detachable from a single supporting frame. The drive has a rotary eccentric which transmits motion directly to the pumping elements of all pumping units. The strokes of the pumping elements are adjustable independently of each other.

22 Claims, 7 Drawing Figures

APPARATUS FOR ADMITTING LIQUID TO THE VESSELS OF DEVELOPING MACHINES FOR PHOTOSENSITIVE MATERIAL

BACKGROUND OF THE INVENTION

The present invention relates to apparatus for conveying fluids, and more particularly to improvements in apparatus for simultaneously conveying several discrete liquid streams, especially liquid streams of different compositions. The invention also relates to a machine, especially a machine for developing exposed photosensitive material, which embodies the above outlined apparatus.

A machine for development of sheets or webs of exposed photographic film, X-ray film, photographic paper or like photosensitive materials comprises several vessels each of which contains a different liquid bath. Thus, a first vessel can contain a supply of liquid developer, a second vessel can contain a fixing bath, and a third vessel can contain a rinsing agent. At least some vessels must be connected with discrete sources of regenerating liquid which is admitted to the respective vessels at a controlled rate, e.g., at a rate corresponding to the combined area of the running exposed photosensitive material which passes through the vessels per unit of time. Furthermore, it is often necessary to circulate the contents of the vessels so as to ensure uniform distribution of the regenerating agent or agents in the respective liquid baths.

In presently known developing machines, each source is connected with the respective vessel by a discrete motor-pump aggregate, and such machines further comprise means for monitoring the rate of transport of photosensitive material through the vessels and for transmitting signals which are used to operate the aggregates as a function of the corresponding rate. The aggregates can further serve to circulate or agitate the contents of the corresponding vessels. A drawback of the just described developing machines is that the numerous motor-pump aggregates contribute to the bulk and complexity, as well as the initial and maintenance costs, of the machines. Moreover, the aggregates generate considerable noise which is especially undesirable when the developing machine is set up for operation in medical laboratories wherein the development of X-ray films is carried out in the presence of physicians, nurses and other persons not directly occupied with the exposure and/or development of X-ray films. Thus, when a developing machine is set up in the office of a physician for stand-by operation, i.e., whenever the need for the exposure and development of X-ray films arises, the noise which is generated by numerous motor-pump aggregates can be disturbing to the patients, to the physician(s) and/or to persons not directly in charge of servicing the developing machine.

German Offenlegungsschrift No. 1,907,159 discloses a micropump assembly with several pumps which receive motion from a common prime mover by way of levers which can be pivoted by a rotary polygonal cam. The pumps include deformable membranes, and the assembly is intended for use in research laboratories to deliver minute quantities of liquids along several discrete paths. A drawback of this assembly is its lack of versatility and the complexity of the system which transmits motion from the prime mover to the discrete membranes.

OBJECTS AND SUMMARY OF THE INVENTION

An object of the invention is to provide a simple, compact, rugged and versatile apparatus for conveying fluids along several discrete paths, e.g., from discrete sources to discrete vessels wherein the fluids contact exposed photosensitive material.

Another object of the invention is to provide a photographic developing machine which embodies an apparatus of the above outlined character.

A further object of the invention is to provide a relatively quiet apparatus wherein a single drive can be used to operate two or more pumping units.

An additional object of the invention is to provide a novel and improved support for two or more pumping units in an apparatus of the above outlined character.

Another object of the invention is to provide an apparatus wherein the number of pumping units can be changed with little loss in time and without necessitating the dismantling or disconnection of the drive and/or the remaining pumping units.

A further object of the invention is to provide simple, compact and inexpensive pumping units for use in the above outlined apparatus.

An additional object of the invention is to provide a modular construction of an apparatus for simultaneous delivery of discrete fluid streams from two or more sources to separate vessels or analogous containers.

Another object of the invention is to provide a developing machine for exposed X-ray films whose noise generation is a small fraction of that of a conventional machine with several motor-pump aggregates.

One feature of the invention resides in the provision of a fluid conveying apparatus, particularly for simultaneous conveying of several discrete fluid streams, especially liquid streams of dissimilar composition. The apparatus comprises a support (e.g., a frame having a plate-like polygonal base portion with a post at each corner of the base portion) provided with a plurality of receiving means (such receiving means may constitute or include sockets which are machined in pairs into each of the posts) and at least one pumping unit detachably coupled to one of the receiving means (e.g., to one socket each of two neighboring posts) and including a reciprocable pumping element. Drive means is connected with the support (e.g., by a quick-release coupling) and has a rotary cam which directly engages the pumping element to move the pumping element when the drive means is operated.

If the apparatus comprises two or more pumping units, the additional units are detachably coupled to discrete receiving means of the support and their reciprocable pumping elements receive motion directly from the cam (e.g., an eccentric) of the drive means.

At least one of the pumping units may comprise a deformable membrane and means for connecting the membrane with the respective pumping element so that the membrane undergoes deformation and alternately draws fluid into and expels fluid from the respective pumping unit in response to reciprocation of the corresponding pumping element (each such element may constitute an elongated straight rod-like component).

Another feature of the invention resides in the provision of a developing machine for exposed photosensitive material with several vessels and several sources of liquid, one for each vessel. The machine further comprises an apparatus which is identical with or analogous to the aforedescribed improved apparatus and whose pumping units serve to convey liquid from the sources to the respective vessels. The pumping units are preferably provided with means for regulating the rate at which the units convey the corresponding liquids.

The novel features which are considered as characteristic of the invention are set forth in particular in the appended claims. The improved apparatus and machine themselves, however, both as to their construction and their mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
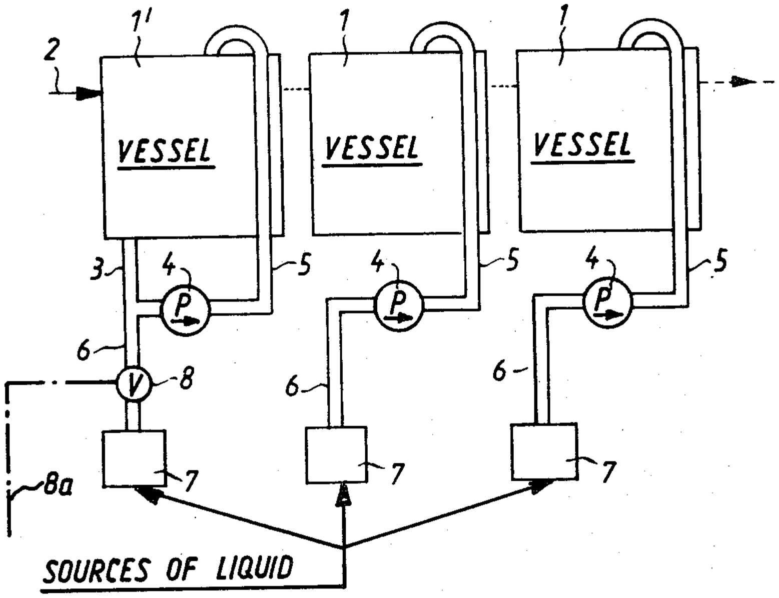
FIG. 1 is a schematic elevational view of a developing machine with a battery of three vessels and an apparatus which embodies the invention and serves to convey liquid media from discrete sources to the respective vessels.

FIG. 1 shows a battery of three vessels or tanks including a first vessel 1' and two additional vessels 1. These vessels form part of a developing machine for photosensitive material, e.g., a web or strip 2 of exposed photographic paper which advances through successive vessels in a direction to the right, as viewed in FIG. 1. The machine further comprises a discrete liquid source 7 for each of the vessels 1' and 1, and an apparatus which embodies one form of the present invention and serves to convey streams of liquid from the sources 7 into the respective vessels 1' and 1. The apparatus comprises three pumping units 4 each of which is operable to draw liquid from the corresponding source 7 by way of a first conduit 6 and to deliver the thus withdrawn liquid into the corresponding vessel 1' or 1 by way of a second conduit 5. For example, the vessel 1' can contain a developing bath, the left-hand vessel 1 can contain a fixing bath, and the right-hand vessel 1 can contain a rinsing bath. The sources 7 can contain supplies of regenerating liquid which is admitted into the respective vessels at a preselected rate, e.g., at a rate conforming to the combined cross-sectional area of the web 2 of photosensitive material which is trasported through a vessel 1' or 1 per unit of time. The manner in which the web 2 is transported along its path forms no part of the present invention.

In a relatively small developing machine, one or more pumping units can further serve to circulate the liquid in the respective vessel. This is shown in the left-hand portion of FIG. 1 where the inlet of the corresponding pump 4 is connected to the respective source 7 (by the conduit 6) as well as to an outlet of the vessel 1' by an additional conduit 3. The conduit 3 merges into the conduit 6 which latter contains a valve 8 that opens only when the web 2 is running. Thus, the left-hand pump 4 of FIG. 1 can continuously circulate the contents of the vessel 1' via conduits 5, 3 but will admit liquid from the source 7 to the vessel 1' only when the web 2 is in motion. The arrangement may be such that the conduit 3 is sealed when the valve 8 is open, i.e., that the contents of the vessel 1' are circulated only when the web 2 is not moving or when the path for the web is empty. The broken line 8*a* denotes an operative connection between the valve 8 and the prime mover for the pumps 4 or between the valve 8 and the controls for the prime mover.

Figure 2:
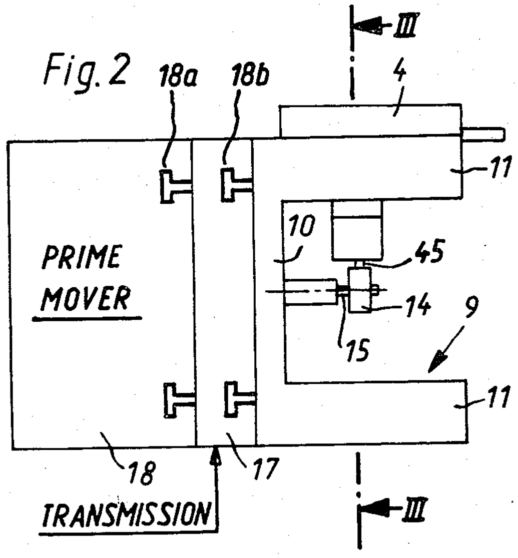
FIG. 2 is an enlarged elevational view of the apparatus which embodies the invention and wherein only one receiving means of the support is coupled to a pumping unit.
Figure 3:
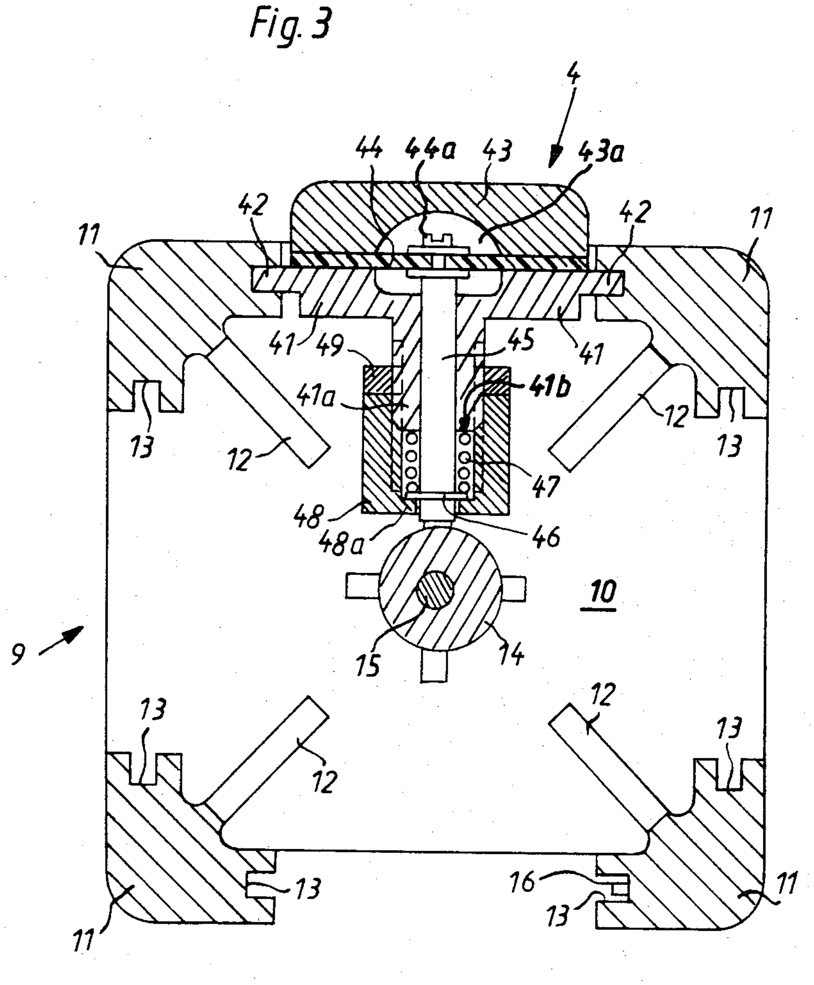
FIG. 3 is a greatly enlarged sectional view as seen in the direction of arrows from the line III—III of FIG. 2.

FIGS. 2 and 3 show the details of the apparatus which can embody the pumping units 4 of FIG. 1. The apparatus further comprises a frame or support 9 which is detachably coupled to one or more pumping units 4 (only one shown in FIGS. 2 and 3). The support 9 includes a polygonal base portion 10 here shown as a square plate with four corner posts 11. Each of the posts 11 is reinforced, e.g., by an elongated rib 12 which extends toward the center of the support 9. Each post 11 is further formed with two mirror symmetrical sockets or recesses 13 which are parallel to its longitudinal direction (i.e., normal or nearly normal to the plane of the base portion 10) and serve to receive complementary male coupling portions or tongues 42 forming part of the inner sections 41 of the housings of the respective pumps 4. Since each section 41 has two tongues 42, it can be said that one socket 13 of each post 11 defines with the nearest socket 13 of the neighboring post 11 a receiving means for the means (ribs 42) which couples a pumping unit 4 to the support 9.

Each pumping unit 4 further comprises a second or outer section 43, a membrane 44 which is clamped between the sections 41, 43 and an elongated rod-like straight pumping element 45 which is secured to the central portion of the membrane 44 by connecting means 44*a* and is provided with a retainer here shown as a collar 46. The element 45 is reciprocable in the axial bore of an elongated tubular extension 41*a* of the section 41. A helical spring 47 reacts against the free end face 41*b* of the extension 41*a* and bears against the collar 46 to urge the element 45 downwardly, as viewed in FIG. 3, and toward the periphery of a rotary eccentric cam 14 forming part of the drive means for the pumping unit 4.

The extension 41*a* is but need not be integral with the pumping unit 4 and is formed with external threads mating with the internal threads of a cupped adjusting device 48 constituting a means for limiting the extent of movement of the element 45 under the action of the spring 47. The extension 41*a* further mates with a lock nut 49 which holds the device 48 in any one of a practically infinite number of different positions. When the spring 47 is free to expand, it maintains the collar 46 in contact with an internal stop shoulder 48*a* of the adjusting device 48. The stroke of the pumping element 45 in a direction toward the peripheral surface of the cam 14 can be altered by the simple expedient of loosening the lock nut 49, rotating the device 48 to a different axial position, and tightening the nut 49 against the device 48.

The remaining features of the pumping unit 4 of FIGS. 2 and 3 are not shown in detail. This pumping unit can be provided with a customary inlet valve which opens when the membrane 44 is deformed to draw liquid from a source 7 into the pump chamber 43*a*, and with an outlet valve which permits liquid to flow from the chamber 43*a* into the respective conduit 5 when the membrane is deformed in the opposite direction. Reference may be had to the aforementioned German Offenlegungsschrift No. 1,907,159 which shows such valves.

The spring 47 may but need not continuously hold the preferably rounded exposed tip of the pumping element 45 in contact with the peripheral surface of the rotary cam 14. The latter is driven by the output shaft 15 of a transmission 17.

The drive means is shown in FIG. 2. The support 9 carries a single pumping unit 4 for the sake of clarity. The pumping element 45 of the unit 4 abuts against or is adjacent to the peripheral surface of the rotary cam 14 which is mounted on and is driven by the output shaft 15 of the transmission 17. The input element (not shown) of this transmission receives torque from the output element of a suitable prime mover 18. The prime mover 18 is connected with the transmission 17 by a quick-release coupling 18*a*, and the transmission 17 is connected with the base portion 10 of the support 9 by a quick-release coupling 18*b*. The illustrated couplings include matching tongue and groove connections. It will be noted that FIG. 3 does not show the manner in which the shaft 15 can be removed prior to detachment of the transmission 17 from the support 9 and/or in which the output element of the prime mover 18 is detached from the input element of the transmission 17 before the coupling 18*a* is disconnected. The shaft 15 preferably extends through the center of the base portion 10. Ready detachability of the prime mover 18 and/or transmission 17 from the support 9 contributes to greater versatility of the improved apparatus and developing machine; moreover, such construction allows for more convenient and more rapid elimination of defects and/or rapid replacement of transmission 17 and/or prime mover 18 with an operative component.

The transmission 17 is of the variable speed type so that the RPM of the shaft 15 can be regulated within a desired range. The arrangement is preferably such that the component 17 is an infinitely variable speed transmission. This, in combination with the provision of stroke adjusting device or devices 48, renders it possible to regulate the flow of one or more liquid streams at any one of an infinite number of different rates so that the quantity of regnerating solution and/or other liquid drawn from each of the sources 7 can correspond to the quantity of photosensitive material which has been transported through the respective vessel 1 or 1' per unit of time. The illustrated membrane-type pumping unit 4 is eminently suited for delivery of liquid at a desired rate.

At least one socket 13 of each receiving means can be provided with resilient retaining means, e.g., with small leaf springs one of which is shown in FIG. 3 at 16. This spring engages one of the tongues 42 when such tongue is inserted into the corresponding socket 13 to thereby reduce the likelihood of or to prevent accidental shifting of a properly installed pumping unit 4 with reference to the support 9.

The spring or springs 16 may be integral with the respective corner post or posts 11. Since the liquids which are used in a developing machine may and often do contain corrosive ingredients, the pumping unit or units 4 as well as all component parts of the support 9 may and often do consist of a suitable corrosion-resistant synthetic plastic material.

Figure 4A:
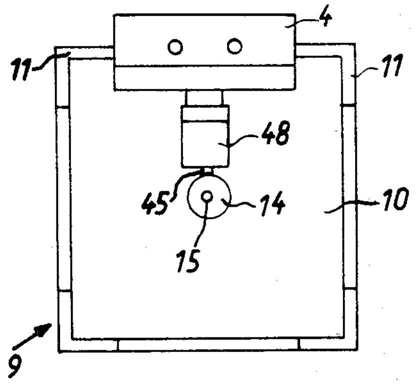
FIG. 4*a* is a front elevational view of the apparatus as seen from the right-hand side of FIG. 2.

FIG. 4*a* is a schematic end elevational view of the structure which is shown in FIGS. 2 and 3. The single pumping unit 4 is removably installed between the two upper corner posts 11 of the support 9. The drive means (with the exception of the eccentric cam 14 and a portion of the shaft 15) is located behind the base portion 10 of the support 9. The position of the device 48 is selected in such a way that, in the illustrated angular position, the cam 14 is contacted by the pumping element 45.

Figure 4B:
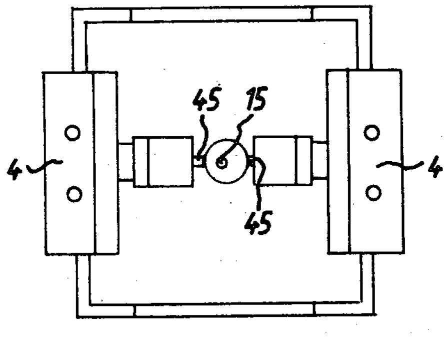
FIG. 4*b* is a similar front elevational view but showing two pumping units which are disposed diametrically opposite each other with reference to the axis of the rotary cam.
Figure 4C:
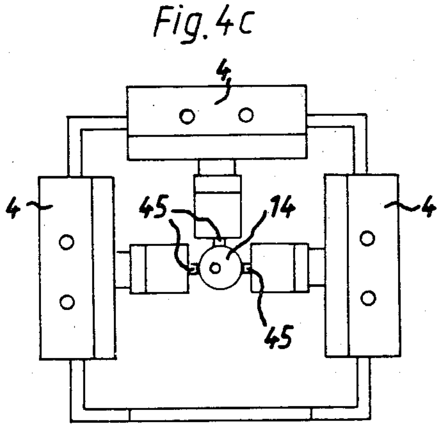
FIG. 4*c* is a front elevational view of an apparatus with three pumping units.
Figure 4D:
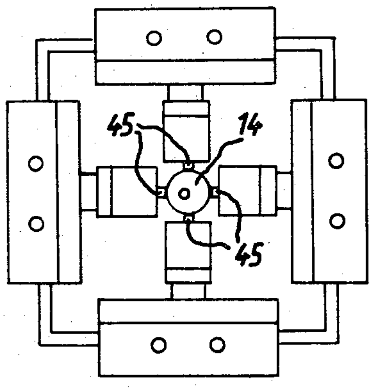
FIG. 4*d* is a front elevational view of an apparatus with four pumping units.

FIGS. 4*b*, 4*c* and 4*d* respectively show apparatus with two, three and four pumping units. The units 4 of FIG. 4*b* are disposed diametrically opposite each other with reference to the shaft 15 therebetween. The pumping element 45 of the left-hand unit 4 performs a return stroke when the element 45 of the right-hand unit 4 performs a forward stroke, and vice versa.

In FIG. 4*c*, the cam 14 transmits motion to the elements 45 of all three pumping units 4, and the apparatus of FIG. 4*d* has a rotary cam 14 which transmits motion directly to four discrete pumping elements 45.

It is further clear that the support 9 can be replaced with a pentagonal, hexagonal, etc. support which can detachably support five, six or more pumping units. This may but need not necessarily entail the provision of a modified rotary cam and/or the utilization of pumping units with larger or smaller housings. In all instances, it is preferred (but not absolutely necessary) to use a common eccentric cam for all pumping elements, i.e., all of the pumping units preferably do but need not always receive motion from a common drive.

An important advantage of the improved apparatus and machine is that a single drive suffices or can suffice to transmit motion to the element or elements of one or more pumping units. Moreover, the apparatus can be assembled of prefabricated modules so that the number of pumping units which are to be used can be changed with a minimum of delay and so that a defective module can be replaced with little loss in time. Modular construction further entails pronounced savings in time when the apparatus is to be cleaned, inspected or converted for operation with different numbers of pumping units. The common support is simple, compact, inexpensive and affords convenient access to the modules which are detachably coupled thereto. The advantages of the detachable drive 17, 18 and of the adjusting or limiting device or devices 48 have been pointed out hereinbefore. The generation of noise is a small fraction of that which is generated by conventional apparatus, mainly because the improved apparatus employs or can employ a single drive. The generation of noise is negligible or at least much less pronounced than in conventional apparatus regardless of whether all of the pumps merely serve as a means for admitting liquid from the respective sources or whether one or more pumps further serve to circulate the liquid in the associated vessel or vessels.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Fluid conveying apparatus, particularly for conveying several discrete fluid streams comprising:
(a) a support;
(b) at least one pumping unit mounted on said support, said unit including a housing having a pumping chamber, and said housing further having a fluid inlet and a fluid outlet which communicate with said chamber, said unit also including a reciprocable pumping element for pumping fluid through said chamber;
(c) drive means connected with said support and having a rotary cam directly engaging said element to move the latter in response to operation of said drive means;
(d) a plurality of first coupling means on said support for engaging a corresponding plurality of pumping units; and
(e) second coupling means on said housing cooperating with a selected one of said first coupling means to removably mount said unit on said support, said second coupling means and said selected first coupling means together defining a connection of the tongue-and-groove type.

2. The apparatus of claim 1, wherein said pumping unit includes a deformable membrane and means for connecting said membrane to said pumping element so that said membrane undergoes deformation in response to reciprocation of said element.

3. The apparatus of claim 1, further comprising means for detachably coupling said drive means to said support.

4. The apparatus of claim 1, wherein each of said pumping element is an elongated straight component.

5. The apparatus of claim 1, wherein said support includes a hollow frame and said cam includes an eccentric.

6. The apparatus of claim 1, further comprising an additional pumping unit similar to said one unit, said additional unit having additional second coupling means which cooperates with an additional one of said first coupling means to removably mount said additional unit on said support, and said additional second coupling means defining a connection of the tongue-and-groove type with said additional first coupling means, said additional unit also having an additional reciprocable pumping element which is directly engaged by said cam.

7. The apparatus of claim 1, wherein each of said first coupling means comprises a set of sockets and said second coupling means comprises a corresponding set of tongues.

8. Developing machine for exposed photosensitive material comprising:
(a) a plurality of vessels;
(b) a source of liquid for each of said vessels;
(c) a support;
(d) a plurality of pumping units mounted on said support and each arranged to supply liquid from one of said sources to the corresponding vessel, each of said units including a housing having a pumping chamber, and each of said housings further having a fluid inlet communicating with the respective source and chamber and a fluid outlet communicating with the respective chamber and vessel, each of said units also including a reciprocable pumping element for pumping fluid from the respective source to the respective vessel;
(e) drive means connected with said support and including rotary cam means arranged to transmit motion to said elements in response to operation of said drive means;
(f) first coupling means on said support for each of said units; and
(g) second coupling means on each of said housing cooperating with the respective first coupling means to removably mount the corresponding unit on said support, each of said second coupling means defining a connection of the tongue-and-groove type with the respective first coupling means.

9. The machine of claim 8, wherein said pumping elements are elongated rod-like components and said cam means includes an eccentric.

10. The machine of claim 8, further comprising elastic retaining means interposed between at least one of said first coupling means and the respective pumping unit.

11. The machine of claim 8, wherein said drive means further includes a prime mover, and a transmission interposed between said prime mover and said cam means.

12. The machine of claim 8, further comprising quick-release means for connecting said drive means to said support.

13. The machine of claim 8, wherein said support includes a frame having a base portion and a plurality of posts extending from said base portion, said first coupling means including sockets in said posts.

14. The machine of claim 13, wherein said base portion includes a polygonal plate and said posts are disposed at the corners of said plate, each of said posts having two sockets and each of said second coupling means including first and second male coupling portions respectively extending into one socket of a first post and one socket of a second post which is adjacent to the first post.

15. The machine of claim 14, wherein said sockets are elongated recesses and said coupling portions are complementary to and substantially fill the respective recesses.

16. The machine of claim 8, wherein said support includes four of said first coupling means.

17. The machine of claim 16, wherein said support is a frame having a substantially square base portion and four posts at the corners of said base portion, said first coupling means being defined by said posts.

18. The machine of claim 8, further comprising means for regulating the rate at which said pumping units deliver liquid from said sources to the respective vessels.

19. The machine of claim 18, wherein each of said regulating means includes means for infinitely varying the extent of reciprocating movement of the respective pumping elements.

20. The machine of claim 19, wherein said pumping elements are movable in directions toward and away from the axis of said cam means and said varying means includes devices for regulating the extent of movement of said elements toward said axis.

21. The machine of claim 20, wherein said housings are stationary and said devices include threaded members adjustably connected to the respective housings and having stops for the corresponding pumping elements.

22. Developing means for exposed photosensitive material comprising:

(a) a plurality of vessels;
(b) a source of liquid for each of said vessels;
(c) a support;
(d) a plurality of pumping units mounted on said support and each arranged to supply liquid from one of said sources to the corresponding vessel, each of said units having a pumping chamber, a fluid inlet communicating with the respective source and chamber and a fluid outlet communicating with the respective chamber and vessel, and each of said units also including a reciprocable pumping element for pumping fluid from the respective source to the respective vessel;
(e) drive means connected with said support and including rotary cam means arranged to transmit motion to said elements in response to operation of said drive means;
(f) cooperating quick-discoonect coupling means on said support and said units to removably mount said units on said support; and
(g) a spring interposed between at least one of said coupling means on said support and the respective unit.

* * * * *